US006221191B1

(12) United States Patent
Davis et al.

(10) Patent No.: US 6,221,191 B1
(45) Date of Patent: *Apr. 24, 2001

(54) POLYESTER-CONTAINING BIAXIALLY-ORIENTED POLYPROPYLENE FILMS AND METHOD OF MAKING THE SAME

(75) Inventors: Alan M. Davis, Barrington; John H. Lawrence, Schaumburg; Tung-Yao Weng, Lake in the Hills, all of IL (US)

(73) Assignee: QPF, L.L.C., Streamwood, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/796,272

(22) Filed: Feb. 7, 1997

Related U.S. Application Data

(63) Continuation-in-part of application No. PCT/US96/09420, filed on Jun. 7, 1996.

(51) Int. Cl.$^7$ ..................................................... B32B 31/16
(52) U.S. Cl. .................... 156/150; 156/229; 156/244.24; 156/332; 428/308.4; 428/451; 428/483; 428/910
(58) Field of Search ................................... 156/150, 229, 156/244.11, 244.24, 272.6, 275.7, 332; 428/910, 446, 447, 450, 458, 483, 304.4, 307.3, 308.4, 451; 264/288.4, 290.2, 291

(56) References Cited

U.S. PATENT DOCUMENTS

| | | |
|---|---|---|
| 4,274,900 | 6/1981 | Mueller et al. ...................... 156/229 |
| 4,709,534 | 12/1987 | Sengewald .............................. 53/452 |
| 4,734,317 | 3/1988 | Bothe et al. .......................... 428/215 |
| 4,759,702 * | 7/1988 | Nakamura et al. ................... 264/291 |
| 4,839,123 | 6/1989 | Duncan ................................. 264/22 |
| 4,874,656 | 10/1989 | Rantanen ............................. 428/216 |
| 4,924,525 | 5/1990 | Bartasis ......................................... 2/2 |
| 5,064,579 | 11/1991 | Kendall et al. ........................ 264/22 |
| 5,151,317 | 9/1992 | Bothe .................................. 428/216 |
| 5,152,946 | 10/1992 | Gillette ................................ 264/230 |
| 5,229,180 | 7/1993 | Littmann ............................... 428/43 |
| 5,302,327 | 4/1994 | Chu et al. ............................. 264/22 |
| 5,324,467 | 6/1994 | Anderson, II ....................... 264/171 |
| 5,353,927 | 10/1994 | Stupar et al. ........................ 206/219 |
| 5,353,985 | 10/1994 | Nägeli et al. ..................... 229/123.1 |
| 5,380,587 | 1/1995 | Musclow et al. .................... 428/353 |
| 5,382,473 | 1/1995 | Musclow et al. .................... 428/353 |
| 5,387,449 | 2/1995 | Kunz et al. ......................... 428/35.4 |
| 5,514,460 * | 5/1996 | Surman et al. ...................... 428/910 |
| 5,637,366 | 6/1997 | Davis et al. ........................ 428/35.8 |

FOREIGN PATENT DOCUMENTS

| | | |
|---|---|---|
| 418 836 | 3/1991 | (EP) . |
| 444 340 | 9/1991 | (EP) . |

* cited by examiner

*Primary Examiner*—Michael W. Ball
*Assistant Examiner*—Michael A. Tolin
(74) *Attorney, Agent, or Firm*—Marshall, O'Toole, Gerstein, Murray & Borun

(57) ABSTRACT

Polyester-containing multilayer biaxially-oriented polypropylene films are provided. According to the invention, a two- or three-layer polyester-containing cap layer is bonded to a monoaxially oriented polypropylene core, followed by orientation of the resulting composite in a direction transverse to the direction of orientation of the core layer. At least one tie layer is interposed between the core and the polyester. Advantageously, the polyester contains silicone fluid as a processing aid.

25 Claims, No Drawings

US 6,221,191 B1

POLYESTER-CONTAINING BIAXIALLY-ORIENTED POLYPROPYLENE FILMS AND METHOD OF MAKING THE SAME

CROSS-REFERENCE TO RELATED APPLICATION

This is a continuation-in-part of International Application No. PCT/US96/09420 filed Jun. 7, 1996.

BACKGROUND OF THE INVENTION

1. Field of the Invention

The invention relates to multilayer polyolefin film structures and methods of making the same and, more particularly, the invention relates to a biaxially-oriented polypropylene film incorporating at least one polyester layer.

2. Description of Related Art

Biaxially-oriented polypropylene (BOPP) films are widely used in packaging because they have good stiffness, strength, optical properties (low haze and high gloss), and moisture barrier properties. Users of packaging films, particularly users of biaxially oriented polypropylene films, are continually seeking structures with improved printability, metallizing properties, and gas barrier. Because of their olefinic nature, typical BOPP constructions have low surface energy and require treatment (corona, flame, etc.) in order to be printed or metallized. Polyester is known to have high surface energy and possesses excellent printing and metallizing attributes. Additionally, polyester, both in clear and metallized structures offers improved gas barrier performance to BOPP films. This is especially true in the case of metallized polyester films which are in order of magnitude or more lower in oxygen transmission rate.

Although there has been a long felt need for BOPP films incorporating polyester layers, problems in obtaining acceptable optical and processability characteristics, adequate interply adhesion, and other properties have been encountered in previous attempts to produce polyester-containing BOPP structures. For example, U.S. Pat. No. 5,324,467 discloses a process for the preparation of an oriented multilayer laminate film having at least three layers, including polypropylene, a tie layer, and copolyester. The films are formed by combining the layers in the molten state, either in coextrusion, or in separate extrusions brought together outside the die, then subsequently cooling the film, orienting it uniaxially or biaxially, and heat setting to lock in the properties. A major problem in producing a structure according to this method on commercial scale equipment is the strong tendency of polyester to adhere to the heated metal rolls of the machine direction orientation section. This makes it difficult to achieve good optical properties free of visual defects and may also decrease other properties such as the seal initiation temperature.

U.S. Pat. No. 4,874,656 describes a multilayer laminate having a high mechanical resistance and an impermeability to gases and vapors. In the disclosed structures, a polyester layer is joined to a polypropylene layer after the polypropylene is biaxially-oriented, the polyester layer is quite thick (i.e., 12 to 24 microns), and the structure includes a layer of metallic foil and a layer of polyethylene. While joining a polyester layer to a BOPP layer after biaxial orientation is possible, this method is impractical for incorporating thin layers of polyester.

U.S. Pat. No. 4,924,525 also describes a structure wherein a polyester laminate is adhered to a BOPP film after the polypropylene is biaxially oriented, precluding the use of thin polyester layers in the final structure.

SUMMARY OF THE INVENTION

It is an object of the invention to overcome one or more of the problems described above.

Accordingly, the invention provides a biaxially-oriented polypropylene film incorporating a polyester layer, and a method of making the same.

The inventive multilayer film is prepared by the steps of forming a polypropylene core, orienting the core in a first direction, providing on at least one side thereof a multilayer outer film (cap layer) comprising at least one polyester layer and at least one tie layer interposed between the polyester layer and the core, and orienting the resulting multilayer film in a second direction transverse to the first direction.

Advantageously, the polyester layer contains sufficient silicone fluid to provide substantially uniform stretching characteristics.

In one embodiment of the invention, an outer surface of the multilayer film opposite the polyester layer is metallized. In another embodiment, a tie layer adhesive is an ethylene/carboxylic acid or anhydride copolymer or an ethylene/ester/carboxylic acid or anhydride terpolymer.

The invention further provides a white or colored biaxially oriented polypropylene film incorporating a polyester layer that is prepared by incorporating inorganic minerals in the polypropylene core layer.

If desired, an additive such as a pigment, dye, etc. may be incorporated into the multilayer film.

In yet another embodiment, the core layer comprises a polypropylene film coextruded between first and second polyolefin layers.

Further objects and advantages of the invention will be apparent to those skilled in the art from a review of the following detailed description taken in conjunction with the appended claims.

DETAILED DESCRIPTION OF THE INVENTION

The invention addresses various concerns of the prior art by providing a structure that positions the polyester at the outer layer of the film, thereby taking advantage of the improved printability and metallizing attributes of polyesters, also eliminates the difficulty of contacting polyester over the heated rolls of the machine direction orienter and, further, provides thin polyester layers that allow a structure of economic value to be produced. An additional benefit of the invention is that a broad range of polyester products, including amorphous homopolymer grades, may be included in the inventive film structures. This allows the designer a wide choice in making films with improved optical properties, printability, and metallizing attributes as well as stiffness and heat resistance.

The films of the present invention provide excellent barrier to flavors and aromas. Moreover, since the polyester layer of the inventive film is formed from an extruded high molecular weight polymer, there is no problem with loss of flavor or aroma barrier due to cracking or abrasion. Furthermore, BOPP films with an external polyester layer can be readily printed or metallized, or adhesively coated on the polyester surface. Also, the film surface opposite the polyester side can be metallized, leaving the polyester layer available for other modifications.

Generally, the polyester-containing BOPP film of the invention includes a core and a multilayer outer film (cap layer) or film adhered to at least one surface of the core. The multilayer BOPP film of the invention is prepared using interdraw coating or lamination techniques.

The BOPP core comprises a layer of polypropylene and, in one embodiment, further comprises a tie layer, as described below.

The cap layer is applied on one or both surfaces of the monoaxially oriented core layer. The cap layer comprises a layer of a polyester resin and at least one tie layer. The tie layer is disposed between the polyester layer and the core.

Additionally, the polyester layer contains a sufficient amount of silicone fluid as a processing aid to provide substantially uniform stretching characteristics to the polyester layer.

In a preferred embodiment, the cap layer contains a second tie layer comprising a polypropylene copolymer or terpolymer or linear ethylene polymer interposed between the adhesive tie layer and the core. In a variation on this embodiment, the polypropylene copolymer or terpolymer tie layer forms part of the core, and is positioned adjacent the polyolefin adhesive tie layer in the final structure. This tie layer may be oriented with the polypropylene layer of the core.

The multilayer BOPP film of the invention is prepared by the steps of forming and orienting the core in a first direction, providing the cap layer to at least one side of the monoaxially oriented core to form a multilayer film, and then orienting the resulting multilayer film in a second direction transverse (and preferably perpendicular) to the first direction to provide a biaxially-oriented multilayer film.

The biaxially-oriented multilayer film may then be subjected to a heat setting treatment to allow the film to crystallize. In a preferred embodiment, an outer surface of the polyester layer and/or an outer surface of the multilayer film opposite the polyester layer is metallized.

The invention is described in more detail below.

Core Structure

As stated above, the core may be a polypropylene monolayer or may comprise a multilayer structure including a core layer of a polypropylene with a tie layer on one or both sides of the core.

The term "polypropylene" as used herein with reference to the core generically denotes a semi-crystalline polymer with a majority of polymerized propylene, and specifically includes isotactic homopolymers of propylene, copolymers of propylene with up to 25 weight percent ethylene or butene, terpolymers of propylene with ethylene and butene, and mixtures thereof.

Preferred polypropylenes are those selected from propylene homopolymers and copolymers of propylene with less than three weight percent comonomer such as ethylene or butene. Melt flow rates of 1 to 15 dg/min, and preferably from 1.5 to 6 dg/min, as measured according to ASTM D1238-90b, Condition 230/2.16 (formerly Condition F) are suitable for sheet or blown film.

The thickness of the core layer is limited only as dictated by oriented polypropylene tenter process limitations, and typically will range from about 12 microns to about 50 microns.

The core may optionally include a tie layer comprising polypropylene copolymer or terpolymer or a linear ethylene polymer coextruded with the polypropylene core layer. While the polypropylene core may be a homopolymer, the coextruded tie layer comprises a copolymer of propylene with up to 25 weight percent of ethylene or butene, mixtures thereof, or a linear ethylene polymer such as linear low density polyethylene (LLDPE). The thickness of the total core structure is limited only by the tenter process limitations as described above and thus is typically about 12 microns to about 50 microns thick. The thickness of an individual coextruded tie layer is typically about 0.5 microns to about 2 microns thick.

One important class of BOPP films are white, pigmented films used in packaging applications. For example, confectionery goods are frequently packaged with white BOPP films because the films provide a light barrier to prevent premature spoilage initiated by UV light and the white films present a clean, appealing surface.

For white film versions made according to the invention, the clear film core structure is modified by the addition of incompatible inorganic minerals. An especially important mineral is titanium dioxide, $TiO_2$, the most commonly used white pigment. Typical $TiO_2$ concentration range in the core is about one weight percent to about 20 weight percent. Thicker films require less $TiO_2$ to attain the same whiteness. For the inventive films, the preferred concentration range is about four weight percent to about 15 weight percent.

Other minerals that may be used are aluminum oxide, zinc oxide (ZnO), calcium sulfate, barium sulfate, calcium carbonate (e.g, chalk), magnesium carbonate, sodium silicate, aluminum silicate, silicon dioxide ($SiO_2$, i.e., silica), mica, clay, talc, and the like in a range of about two weight percent to about 25 weight percent in the core. The action of these minerals is to cause formation of cavities or voids in the film. These cavities contribute to making the film more opaque due to multiple light scattering. The concentration of the minerals and their particle sizes help determine the void structure and several film properties.

Other additives can be used, such as antioxidants, lubricants, surfactants, antistats, slip agent, antiblock agents, nucleating agents, coupling agents, and coated minerals. Similarly, addition of pigments and dyes (inorganic and organic) to the core or encapsulating coextruded layers of the white versions can yield colors other than white.

Addition of the minerals may be accomplished by using a separate feed stream of mineral into the extruder that produces the core polypropylene melt layer, or by initially blending a dry mix of the mineral and polypropylene and then extruding the mixture, or by masterbatch concentrate. Masterbatch concentrates of the minerals in polypropylene are first melt compounded. These concentrates are then separately added to the core extruder feed with the polypropylene.

In one embodiment, the white film core structure comprises three coextruded layers. The center layer (typically 10 microns to 50 microns in thickness), is encapsulated by two outer coextruded polyolefin layers. These typically 0.5 microns to 5 microns thick encapsulating layers provide continuous non-porous layers. Minerals may be contained in any of the core layers. In one form, the center layer contains the whitening minerals, and the encapsulating layers may contain $TiO_2$ to enhance the whitening power. In another version, these encapsulating layers may contain $TiO_2$ and cavitating minerals such as $CaCO_3$, for example, whereas the middle layer is free of $TiO_2$ or other minerals.

If desired, a white film may have a metallized outer surface, on an outer surface of the polyester layer and/or an outer surface of the multilayer film opposite the polyester layer.

Cap Film

The cap layer comprises a two-layer or three-layer film, including an outer, polyester layer and a first tie layer comprising a polar or grafted olefin polymer adhesive.

Preferably, the cap layer further includes a second tie layer comprising a copolymer of propylene with up to 25 weight percent of ethylene or butene, a terpolymer of propylene, ethylene, adhesive, mixtures thereof, or a linear ethylene polymer, such as LLDPE.

The polyester layer comprises a crystalline copolyester, a crystallizable amorphous polyester homopolymer, or a crystallizable amorphous copolyester. (The terms "crystalline" and "amorphous" describe the solid state structure of the polyester as supplied by the vendor and prior to orientation.) By the term "copolyester" it is meant that the polyester is the reaction product of at least one polyol and one carboxylic acid, with there being a total of at least three monomers selected from the polyols and acids. "Homopolymer" polyesters are understood to include a single polyol and a single acid moiety.

The polyester layer contains, as a processing aid, a sufficient concentration of a silicone fluid (i.e., a dimethyl polysiloxane or equivalent), preferably of a high molecular weight (e.g., having a viscosity in the range of 300,000 cps to about 2,000,000 cps, highly preferably about 1,000,000 cps as measured by Brookfield viscometer) in an amount sufficient to provide uniform polyester stretching characteristics. Typically, a polyester layer intended for subsequent metallization will contain about 1,000 ppm to about 3,000 ppm silicone fluid, preferably about 1,000 ppm to about 2,000 ppm (based on the weight of the polyester) in the polyester layer. Polyesters not intended for metallization may contain higher concentrations (e.g., up to about one weight percent) of silicone fluid, if desired. (Silicone fluid concentrations greater than about one weight percent leads to intermittent, non-steady state extrusion.)

Baysilone silicone fluid M 1,000,000 is preferred silicone fluid.

The silicone fluid may be added to the polyester by intensive mixing with pellets of polyester resin in order to coat the pellets, followed by drying of the coated pellets, and extrusion. A Henschel mixer is suitable for preparing the silicone fluid-coated pellets.

The adhesive tie layer adhered to the polyester layer may comprise a copolymer of ethylene with an ester such as an ethylene/vinyl acetate copolymer, or an ethylene/methyl acrylate copolymer, an ethylene/n-butyl acrylate copolymer, or an ethylene/ethyl acrylate copolymer, for example. Ionomers (partially hydrolyzed ester derivatives) are also suitable comonomers. Alternatively, the first tie layer may comprise a grafted polyolefin adhesive, such as a polyethylene or polypropylene backbone grafted with at least one ethylenically unsaturated carboxylic acid, carboxylic acid anhydride, or other derivative, as known in the art.

Either of the first and second tie layers may be a copolymer of ethylene and a carboxylic acid or carboxylic acid anhydride, or a terpolymer of ethylene, an ester, and a carboxylic acid or carboxylic acid or anhydride. Suitable carboxylic acids and carboxylic acid anhydrides include, but are not limited to acrylic acid, methacrylic acid, and maleic acid or maleic anhydride (the latter generally used as grafting monomers).

Suitable terpolymers may have the ethylene, ester, and acid or anhydride incorporated 28 into a main chain of the polymer, or may comprise an ethylene/ester copolymer grafted with the acid or anhydride.

Preferred adhesives include maleic anhydride modified ethylene-vinyl acetate, such as Bynel® E418 adhesive resin available from DuPont, and Escor® ATX 325 acid terpolymer available from Exxon Chemical, which is an ethylene-based resin having both ester and acrylic acid functionality.

In a preferred embodiment, the cap layer further comprises a second tie layer comprising a propylene copolymer or terpolymer or a linear ethylene polymer such as LLDPE, as described above. In this embodiment, the ethylene/ester copolymer or grafted polyolefin adhesive is interposed between the second tie layer and the polyester layer.

The respective thicknesses of the polyester layer, first tie layer, and second tie layer may vary within wide ranges, and are substantially independent of each other. Typical approximate thicknesses for the polyester, first tie layer, and second tie layer in the final film are as follows:

| Polyester layer: | 0.75 to 2.5 microns |
| --- | --- |
| First tie Layer: | 0.5 to 2.5 microns |
| Second tie Layer: | 0.25 to 1.5 microns |

Preferably, the total thickness of the cap layer is in the range of about 1.5 microns to about 6.5 microns in the final film.

The cap layer may be formed by any suitable process, including blown or cast film coextrusion, as desired.

Although no further additives to the polyester layer are necessary, suitable antiblock agents such as zeolites may be advantageously used. Other silicates, clays, talcs, and silicas are suitable antiblock agents, and the antiblock agents are generally used in a concentration of about 500 to about 10,000 ppm (preferably about 500 to about 1500 ppm) based on the weight of polyester.

Other additives, particularly stabilizers, may be used to protect the cap layer from degradation during processing, or to impart other desired attributes to the final film.

Preparation of Multilayer BOPP Film

The polyester-containing cap layer is added to the core by interdraw coating or lamination. (Interdraw coating or lamination processes are disclosed in U.S. Pat. No. 5,156,904 to Rice et al., the disclosure of which is incorporated herein by reference.) In this method, the core is formed by extruding and casting the polypropylene core, orienting the core in a first ("machine") direction, forming the polyester-containing outer films, providing the cap layer on one or both sides of the oriented core to produce a monoaxially oriented multilayer film, and orienting the resulting multilayer film in a second direction transverse (and preferably perpendicular) to the first direction.

In practice, a monolayer core or a coextruded laminate of the core polypropylene and a propylene copolymer or terpolymer or linear polyethylene tie layer may be cast onto a roll maintained at a temperature in the range of, e.g., 10° C. to 100° C., reheated over rolls heated to a temperature (e.g., 100° C. to 204° C.) high enough to soften the polymer(s) in the core yet below the melting point of the propylene polymer thereof, and then oriented in the machine direction. After the subsequent addition of the cap layer(s), the resulting film is reheated to a temperature preferably higher than the softening point of the outer film layers (e.g., 73° C.) and somewhat below the melting point of the core polypropylene (e.g., 150° C. to 165° C.), and the film is oriented in a second direction transverse (and preferably perpendicular) to the machine direction.

A cap layer may be applied to one or both sides of the core. Similarly, the core may contain a propylene polymer or terpolymer or linear ethylene polymer tie layer on one or both sides of the polypropylene core. The multilayer BOPP structure may but need not be symmetrical; for example, a two-layer cap film may be disposed on one side of the core with a three-layer cap film on the other.

The following non-limiting examples illustrate the practice and benefits of the invention.

EXAMPLES

All the films described in the following examples were produced in a sequential orientation process. In this process the core layer was extruded and formed into a sheet prior to machine direction orientation. The core layer was then oriented approximately 500%. The cap layers were adhered to the core layer and the resulting multilayer film was fed to a tenter oven where the film was transverse oriented approximately 900%, heat set, cooled, and wound onto a roll. The initial thickness of the core layer in all the examples was approximately 810 microns. The thickness after machine direction orientation was 162 microns. The cap layers evaluated range in thickness from 20 to 35 microns. The thickness of the final, multilayer films varied from about 20 to 30 microns. The output rate of the examples ranged from 250 lb/hour to 400 lb/hour (113 kg/hour to 183 kg/hour). The core layers were produced using one of two commercially available isotactic homopolymer polypropylene resin grades—Fina 3275 or Exxon 4152. Other film grade polypropylene resins are suitable for use as the core layer in the experiments described. Example 4 describes representative process conditions used to produce the films in all the examples.

Sample Evaluation Methodology

Several films made according to the invention were evaluated for the key attributes listed below. Since an intended use of the films is for packaging, either alone or in laminations, the films should exhibit good appearance, sealability, and integrity. In addition, economic considerations dictate that the films process readily with broad process capability and low waste.

Visual Criteria

All the clear films were rated for haze and optical defects. Haze is measured according to ASTM D-1003.

| Rating | Comments |
| --- | --- |
| Excellent | Haze < 2, minimal optical defects |
| Good | Haze < 3, minor optical defects |
| Fair | Haze < 5, some optical defects |
| Poor | Haze > 5 |

Polyester Layer Seal Strength

All the clear (i.e., unmetallized) films were evaluated for seal strength by cutting one-inch wide strips and sealing the polyester surface to itself at three temperatures, i.e., 110° C., 125° C., and 145° C. on a Brugge Munchen heat sealer, type NDS, using a 0.5 second dwell time and 0.5 psi of applied pressure. The seals were pulled on an Instron 4201 testing machine. The peak value was noted and the mode of failure was determined by visual inspection. An acceptable seal is deemed to have a minimum peak strength of 75 grams/inch. "Destruct" denotes a failure mode at the sealing interface or excessive distortion of the film. "Delamination" denotes a failure mode between layers of the film (e.g., tie/polyester interface or tie/core interface).

| Rating | Comments |
| --- | --- |
| Excellent | Seal initiation at lowest temperature, failure mode "Destruct" |
| Good | Seal initiation between 110° C. and 125° C., failure mode "Destruct" |
| Fair | Seal initiation between 110° C. and 125° C., failure mode "Delamination" |
| Poor | No acceptable seals |

Interlaminar Adhesion Before Metallizing

This property was evaluated by heat sealing films together as described above and noting the failure mode at various temperatures. The test was conducted on clear film samples before metallizing to determine the effect of that process on Interlaminar adhesion.

| Rating | Comment |
| --- | --- |
| Excellent | 100% DESTRUCT seals at all temperatures |
| Good | DESTRUCT failure mode predominates |
| Fair | DESTRUCT failure mode in some cases |
| Poor | 100% DELAMINATION |

Metal Adhesion

This property was evaluated by applying five eight-inch long strips of Scotch brand 610 tape (by 3M) to the metallized surface in both the machine and transverse directions, pressing the strips firmly to the film and then rapidly pulling the tape at a 90° angle to the substrate. The mode of failure (metal delamination or delamination at a polymer/polymer interface) was denoted as was the percent of metal removed from the surface. The samples were then rated.

| Rating | Comments |
| --- | --- |
| Excellent | 0–10% metal delamination |
| Good | 10–50% metal delamination |
| Poor | >50% metal delamination and/or any sign of delamination at a polymer/polymer interface |

Processability

This is a broad category that includes aspects of preparing the cap layer, adhering the cap layer to the core layer, stretching the combined films, and processing through subsequent operations.

| Rating | Comments |
| --- | --- |
| Excellent | Broad process window, strong adhesion, readily stretches, good winding characteristics, good converting properties |
| Good | Narrower process window, good adhesion, good stretching, winding and converting characteristics |
| Fair | Narrow process window, adequate adhesion, stretches under optimal conditions (some stretching bands evident), adequate converting properties |
| Poor | Difficult to process, inconsistent adhesion, non-uniform stretching characteristics. |

Evaluations of the films are presented in the table entitled "Summary of Results" following the descriptions of the examples.

Example 1—Combining Monolayer Outer Film to Treated Propylene Homopolymer Via Interdraw Lamination In this example, a monolayer core of isotactic polypropylene homopolymer was extruded onto a cast/chill roll, subsequently heat conditioned, oriented 500% in the machine direction and then surface-treated using a flame treatment technique. A monolayer outer film produced using an amorphous copolyester was subsequently adhered to the treated surface of the polypropylene homopolymer. The resultant structure was reheated, transverse direction oriented approximately 900%, cooled, and wound onto a roll.

The film produced in this manner exhibited acceptable optical properties although some non-uniformity in drawing on the copolyester was noted. The Interlaminar adhesion to the copolyester of the polypropylene was very low (<50 gm/inch). The film was not subjected to other processes (i.e., metallizing) due to the low Interlaminar adhesion.

Example 2—Combining Two Layer Cap Layer with a Propylene Homopolymer Via Interdraw Lamination In this example a monolayer core of isotactic polypropylene homopolymer was extruded onto a cast/chill roll, subsequently heat conditioned, and then oriented 500% in the machine direction. A series of two-layer cap films produced using an amorphous polyester copolymer and various tie layer resins were subsequently adhered to the propylene homopolymer. The resultant structures were reheated, transverse direction oriented approximately 900%, cooled and wound onto a roll. The resulting clear films, prior to metallizing, were tested for visual appearance, seal strength, and Interlaminar adhesion. Each of the samples was then metallized to an optical density of 2.1 using aluminum in a vacuum deposition chamber. The metallized samples were evaluated for seal strength (on the non-metallized side) and metal adhesion.

| Structure 2A) | Polyester Layer: | 90% DuPont Selar PT 8307 |
| | | 9% Eastman Kodabond 13162 |
| | | 1% C0047 |
| | Tie Layer: | 100% Admer AT776 |
| Structure 2B) | Polyester Layer: | 90% DuPont Selar PT 8307 |
| | | 9% Eastman Kodabond 13162 |
| | | 1% C0047 |
| | Tie Layer: | 100% Quantum EVA UE 635 (Ethylene - vinyl acetate copolymer) |
| Structure 2C) | Polyester Layer: | 90% DuPont Selar PT 8307 |
| | | 9% Eastman Kodabond 13162 |
| | | 1% C0047 |
| | Tie Layer: | 100% DuPont Bynel 446 and 774 (Maleic anhydride graft modified ethylene vinyl acetate copolymer) |

These films were an improvement of the film produced in Example 1. They exhibited acceptable seal strength and Interlaminar adhesion. The film produced in this manner did not draw evenly and proved difficult to process. The two layer cap film was very brittle and had very poor tear resistance. This resulted in difficulty adhering the cap layer to the core layer and in excessive occurrence of web breaks during transverse direction orientation.

Structure 2B exhibited lower seal strength and lower Interlaminar adhesion than either structure 2A or 2C. The low melting point of the EVA tie layer led to relatively easy delamination with the polyester layer either during sealing or as a result of metallizing.

These trials optimized the layer thickness for a two layer cap film. A copolyester layer in excess of 22 microns thick did not stretch evenly. A copolyester layer less than 6 microns thick did not produce good low temperature seals. These thickness phenomena also held true for the tie layer. A tie layer in excess of 22 microns thick did not stretch evenly. A tie layer less than 8 microns thick had poor ply adhesion and did not draw the copolyester evenly.

Example 3—Addition of a Processing Aid to Improve Drawing of the Polyester Layer In this example, a monolayer core of isotactic polypropylene homopolymer was extruded onto a cast/chill roll, subsequently heat conditioned, and then oriented 500% in the machine direction. To each surface of the core layer, one of five cap layer constructions was adhered via interdraw lamination. In each case the resultant structure was reheated, transverse direction oriented approximately 900%, cooled, and wound onto a roll. The clear films, prior to metallizing, were tested for visual appearance, seal strength, and interlaminar adhesion. Each of the samples was then metallized to an optical density of 2.1 using aluminum in a vacuum deposition chamber. The metallized samples were evaluated for seal strength (on the non-metallized side) and metal adhesion. The five structures used in this example are described below.

| | | |
|---|---|---|
| Structure 3A) | Polyester Layer: | 89% DuPont Selar PT 8307 (amorphous copolyester) 10% DuPont Selar PR 4234 (toughened copolyester) 1% C0047 slip/anti-block masterbatch |
| | Tie Layer: | Ethylene methyl acrylate copolymer blend (70% Chevron 2205, 30% Chevron EMAC+2305) |
| Structure 3B) | Polyester Layer: | 93% DuPont Selar PT 8307 (amorphous copolyester) 6% Eastman Kodabond 13162 (PETG copolymer) 1% C0047 MB |
| | Tie Layer: | Ethylene methyl acrylate copolymer (70% Chevron 2205, 30% Chevron EMAC+2305) |
| Structure 3C) | Polyester Layer: | 93% DuPont Selar PT 8307 (amorphous copolyester) 6% Eastman Kodabond 13162 (PETG copolymer) 1% C0047 MB 3000 ppm silicone fluid |
| | Tie Layer: | Ethylene methyl acrylate copolymer (70% Chevron 2205, 30% Chevron EMAC+ 2305) |
| Structure 3D) | Polyester Layer: | DuPont Selar PT8307 (amorphous copolyester) 1% C0047 MB 3000 ppm silicone fluid |
| | Tie Layer: | Ethylene methyl acrylate copolymer (70% Chevron 2205, 30% Chevron EMAC+2305) |
| Structure 3E) | Polyester Layer: | DuPont Selar PT 8307 (amorphous copolyester) 3000 ppm Baysilone M 1,000,000 silicone fluid |
| | Tie Layer: | Ethylene methyl acrylate copolymer (70% Chevron 2205, 30% Chevron EMAC+2305) |

In each case, the total thickness of the cap layer was approximately 25 microns, including 15 microns of the polyester layer and 10 microns of the tie layer.

Structure 3A exhibited excessive haze and low gloss (poor visuals) and only fair seal strength due to the presence of the toughened copolyester.

Structure 3B was difficult to process due to brittleness which resulted in uneven stretching and web breaks. This resulted in only Fair visuals, seal strength, and interlayer adhesion due to inconsistency across the web.

Structure 3C exhibited improved processability compared to Structure 3B, which resulted in more uniform properties.

Structure 3D processed similar to Structure 3C without the use of PETG copolymer, which improved processability of Selar PT 8307 in the absence of other additives.

Structure 3E again processed similarly to Structure 3C but had the best visuals and good processability.

In all cases the adhesion of the tie layer to the core was reduced after metallizing resulting in a downgraded performance.

Example 4—Combining Two- and Three-Layer Cap Layer with a Propylene Homopolymer Core In this example, a monolayer of isotactic polypropylene homopolymer with a melt temperature of 254° C., was extruded onto a cast roll set to a temperature of 36° C. to form the core layer. The initial thickness of the core layer was approximately 810 microns. The core layer surface opposite the cast roll was then contacted against a chill roll with a surface temperature of 72° C. The core layer film was then heat conditioned to 121° C. by contacting with a series of heated rolls and subsequently machine-direction oriented 500% across a pair of rolls heated to 141° C. The 162 micron thick, monoaxially oriented core layer was then contacted on each surface to tempering rolls set a temperature of 141° C. At this point in the process, the cap layer structures, each approximately 23 microns thick, were thermally adhered to the core layer. This experiment evaluated three distinct cap layer structures, each of which was applied to the surface of the core layer to make a symmetrical structure. The 208 micron thick, multilayer film structures were then inserted into an endless chain mechanism (being held by a series of clips) and fed to an oven. After reconditioning the multilayer film at 121° C., the structure was transverse direction oriented 900% at a temperature of 138° C. The film exited the oven and was subsequently cooled to approximately 80° C. and wound onto a roll. The final thickness of each sample was approximately 23 microns. The output rate of the process was approximately 400 pounds/hour (182 kg/hour). The line speed in the extrusion and casting section was 26 meters/minute while after machine direction orientation the line speed increased to 133 meters/minute.

The clear films, prior to metallizing, were tested for visual appearance, seal strength, and Interlaminar adhesion. Each of the samples was then metallized to an optical density of 2.1 using aluminum in a vacuum deposition chamber. The metallized samples were evaluated for seal strength (on the non-metallized side) and metal adhesion.

| | | |
|---|---|---|
| Structure 4A) | Polyester Layer: | 90% DuPont Selar PT 8307 9% Eastman Kodabond 13162 1% C0047 |
| | Tie Layer: | Quantum EVA UE 635 |
| Structure 4B) | Polyester Layer: | 90% DuPont Selar PT 8307 9% Eastman Kodabond 13162 1% C0047 |
| | Tie Layer: | DuPont Bynel 446 and 774 blend |
| Structure 4C) | Polyester Layer: | 100% DuPont Selar PT 8307 1500 ppm Baysilone M 1,000,000 silicone fluid |
| | 1st Tie Layer: | Quantum EMA EMTR002 |
| | 2nd Tie Layer: | Polypropylene Random Copolymer (Exxon 9122, PD 9263, PT 9524, PT 9513, Fina CR6671BB, 6571) |

Structure 4C, incorporating a three-layer cap film structure, exhibited the best properties of any film produced. It processed readily across a broad range of process conditions and produced a film with excellent visual properties, excellent seal strength, and superior Interlaminar adhesion—both before and after metallizing. The three-layer outer film drew evenly, processed readily, was not brittle, and had good tear resistance.

Structure 4C exhibited the best Interlaminar adhesion, both before and after metallizing. Whereas most two-layer structures exhibited a reduction in Interlaminar adhesion after metallizing, the Interlaminar adhesion of three-layer outer film structure was unchanged.

Finally, these trials were useful in optimizing the level of process aid required in the polyester layer. A level below 1000 ppm did not give good draw properties. A level in excess of 3000 ppm reduced seal properties and did not give good metal adhesion.

Example 5—Combining Two Three-Layer Cap Films with a Polypropylene Homopolymer Via Interdraw Lamination In this example a monolayer core of isotactic polypropylene homopolymer was extruded onto a cast/chill roll, subsequently heat conditioned, and then oriented 500% in the machine direction. To the core, two three-layer cap layers were adhered to each core layer surface via interdraw lamination. In each case the resultant structure was reheated, transverse direction oriented approximately 900%, cooled, and wound onto a roll. The clear films, prior to metallizing, were tested for visual appearance, seal strength, and Interlaminar adhesion. Each sample was then metallized to an optical density of 2.1 using aluminum in a vacuum deposition chamber. The metallized samples were evaluated for seal strength (on the non-metallized side) and metal adhesion.

One of the three-layer cap films was produced using an amorphous copolyester and subsequently adhered to the polypropylene homopolymer. This layer had excellent low temperature seal properties. A second three-layer outer film was produced with a blend of a crystallizable amorphous copolyester and amorphous copolyester or crystallizable amorphous homopolymer and amorphous copolyester. This layer produced an excellent base for metallization.

| Structure 5A) | Outer Layer: | Blend of DuPont Selar PT 8307/8111 1500 ppm Baysilone M 1,000,000 silicone fluid |
| | 1st Tie Layer: | Quantum EMA, EMTR002 |
| | 2nd Tie Layer: | Polypropylene random copolymer (Exxon 9122, PD 9263, PT 9524, PT9513, Fina CR6671BB, 6571) |
| Structure 5B) | Outer Layer: | Blend of DuPont Selar PT 8307/7001 |
| | 1st Tie Layer: | Quantum EMA, EMTR002 |
| | 2nd Tie Layer: | Polypropylene Random Copolymer (Exxon 9122, PD 9263, PT 9524, PT 9513, Fina CR6671BB, 6571) |
| Structure 5C) | Outer Layer: | Blend of DuPont Selar PT 8307/X175 |
| | 1st Tie Layer: | Quantum EMA, EMTR002 |
| | 2nd Tie Layer: | Polypropylene Random Copolymer (Exxon 9122, PD 9263, PT 9524, PT 9513, Fina CR 6671BB, 6571) |

The films produced in this manner resolved many of the concerns noted with the previous structures. The multilayer BOPP films drew evenly and did not prove difficult to process. The three layer outer films were not brittle and had good tear resistance.

Observations of useful layer thickness and silicone fluid concentration ranges were identical to those of Example 4.

Summary of Results

| Structure | Visual Rating | Seal Strength | Clear Film Interlayer Adhesion | Metal Adhesion | Processability |
|---|---|---|---|---|---|
| 1 (monolayer) | Fair | Poor | Poor | Poor | Good |
| 2A (2-layer) | Fair | Good | Good | Poor | Poor |
| 2B | Fair | Fair | Fair | Poor | Good |
| 2C | Fair | Good | Fair | Poor | Fair |
| 3A (2-layer) | Poor | Fair | Good | Poor | Fair |
| 3B | Fair | Fair | Fair | Poor | Poor |
| 3C | Good | Good | Good | Poor | Good |
| 3D | Good | Good | Good | Good | Good |
| 3E | Excellent | Good | Good | Good | Good |
| 4A (2-layer) | Good | Fair | Fair | Poor | Fair |
| 4B (2-layer) | Fair | Fair | Good | Poor | Fair |
| 4C (3-layer) | Excellent | Excellent | Excellent | Excellent | Excellent |
| 5A (3-layer) | Good | N/A | Excellent | Excellent | Good |
| 5B (3-layer) | Good | N/A | Excellent | Excellent | Good |
| 5C (3-layer) | Good | N/A | Excellent | Excellent | Good |

Example 6—Three-Layer Cap Film with a Treated Polypropylene Homopolymer Via Interdraw Lamination In this example, a monolayer core of isotactic polypropylene homopolymer was extruded onto a cast/chill roll, subsequently heat conditioned, and then oriented 500% in the machine direction. To the core, one three-layer cap layer was adhered to the surface via interdraw lamination. The resultant structure was reheated, transverse direction oriented approximately 900%, cooled, homopolymer side corona treated and wound onto a roll. The homopolymer side was then metallized to an optical density of 2.1 using aluminum in a vacuum deposition chamber.

Compared to the metallized samples of Example 4C and 5C, respectively, the metallized sample of Example 6 had a different balance of properties, even though all three films were vacuum metallized to an optical density of approximately 2.1. The structures of Examples 4C and 5C were metallized on a polyester surface while that of Example 6 was metallized on a homopolymer polypropylene surface. The metallized films of Example 4C and 5C exhibited higher moisture vapor transmission rates and lower oxygen transmission rates than the metallized film of Example 6.

| Structure | Metallized Substrate | Oxygen Transmission Rate[1] | Moisture Vapor Transmission Rate[2] |
|---|---|---|---|
| 4C | Polyester | 13 | 1.2 |
| 5C | Polyester | 7 | 0.5 |
| 6 | Homopolymer PP | 31 | 0.4 |

[1] $cc/m^2/24$ hours measured at 73° C., 0% RH
[2] $gm/m^2/24$ hours measured at 100° C., 90% RH These examples demonstrate the utility of being able to metallize either surface of the film—depending on the end-use requirements of the applications. For example, in a confectionery application requiring good moisture barrier and excellent cold seal adhesion to the non-metallized surface, it is preferable to metallize the homopolymer polypropylene and apply the cold seal to the polyester surface. In an application requiring high oxygen barrier it is preferable to metallize the polyester surface.

Examples 7–9—White Films

White films were prepared in each of Examples 7–9 by the inventive method wherein the core layer was oriented to a degree of 500% in the machine direction, followed by application of the outer layers to the core and orientation of the resulting three layer film to a degree of 900% in the transverse direction.

Example 7—White Film

A three layer white film with a total gauge of 26 microns was prepared. The core (22 microns) contained 8.4 weight percent $CaCO_3$ as a cavitating agent with four weight percent $TiO_2$ for whitening and 87.6 weight percent of a 2 MFR homopolymer polypropylene. One outer layer (one micron) was an ethylene-propylene random copolymer seal layer made from a 6 MFR resin with 6.5 weight percent ethylene. The other outer layer used the same three layer cap film as described in Structure 4C, above. The film had 0.4 optical density and a pleasing white appearance.

Example 8—White Film

The film of Example 8 had the same core structure as the film of Example 7 with $CaCO_3$ and $TiO_2$ and a 22 microns gauge. On either side of the core were three micron, coextruded layers of the same 2 MFR homopolymer polypropylene used in the core, but without minerals. On one side of this three layer core was the three layer cap film described in Structure 4C. The film of Example 8 had a 0.67 optical density and a pleasing white, somewhat pearlescent appearance. When the film was vacuum metallized with aluminum on the film surface opposite the polyester side, the optical density increased to 2.4. Thus, the white film had one brightly aluminized surface.

Example 9—White Film

In this example, a white film as in Example 8 was made except that after orienting the core (including the encapsulating layers) in one direction, a thick EVA cap layer was provided on one side of the core. At the same time, the three layer polyester cap film was provided on the opposite site of the core. The resulting multi-layer film was then oriented in a second direction transverse to the first.

The final film gauge was 41 microns. The EVA layer thickness was approximately 11 microns. This thick EVA layer was used to improve seal strength at lower applied temperatures. The film of Example 9 was cut into 25 microns wide strips. Then the EVA surfaces of two strips were heat sealed to one another at temperatures in the range of 230° F. to 270° F. The process was repeated at several temperatures (0.5 seconds of applied heat and 20 psi pressure). In the same way, the ethylene-propylene copolymer seal layers of Example 7 were heat sealed to themselves. The structures of Example 9 with the thick EVA layer initiated seals at lower temperatures and gave seal strengths nearly double the films with conventional ethylene-propylene copolymer layers.

Example 10—Inorganic Pigment in the Cap Film

Structure 10A: A 25 micron monolayer film consisting of a 2 MFR homopolymer polypropylene with a two-layer cap film on one side was made according to the inventive method. The two-layer cap film indicates a tie layer of ethylene/methyl acrylate copolymer and a copolyester layer of DuPont Selar 8307 as the outside layer. Blended with the copolyester were different amounts of $TiO_2$ filler. The concentration levels were 10%, 20%, and 30% by weight. After the transverse direction stretching step, the outside copolyester layer with the $TiO_2$ filler was about 1.6 microns in thickness. At constant layer thickness and degree of stretch, the resultant optical density values increased as the amount of $TiO_2$ concentration increased as shown in the table below. It can be seen from this example that the capacity of the film can be increased by varying the amount of $TiO_2$ in the outside layer without any filler additives in the core layer.

| % $TiO_2$ in cap film | 0 | 10 | 20 | 30 |
|---|---|---|---|---|
| Optical Density | 0 | 0.14 | 0.21 | 0.25 |

Structure 10B: In this example, the film structure and method of making the film were similar to Structure 10A, above, with the principal difference being that instead of the $TiO_2$ filler in the outside copolyester layer, one micron particle size $CaCO_3$ filler was used at 5%, 10% and 20% (by weight) loading levels. The corresponding haze and 45 degree gloss values are shown in the table below. Although the $CaCO_3$ filler in the outside layer did not make the film opaque, it made the film hazier and provided a matte texture on the surface as evidenced by the 45 degree gloss data.

|  | % $CaCO_3$ in cap film | | | |
|---|---|---|---|---|
|  | 0 | 5 | 10 | 20 |
| % Haze | 3 | 9 | 13 | 19 |
| 45 deg. Gloss | 109 | 66 | 54 | 46 |

From the foregoing detailed description, it will be apparent to those skilled in the art that the invention provides useful biaxially-oriented polypropylene film composites containing two- or three-layer polyester-containing cap films using amorphous or crystalline copolyesters or amorphous homopolymer polyesters. For some applications, composite films containing three-layer polyester outer layers are preferred as they offer superior processability, interply adhesion, and appearance characteristics.

The use of silicone fluid as a processing aid in the polyester layer improves stretchability and uniformity of the layer and eliminates the need to blend in additional amorphous copolyester as a processing aid. The multilayer BOPP films of invention retain the excellent surface energy characteristics of polyesters, thus providing an excellent surface for metallizing. Pretreatment of the polyester layer is not necessary to achieve excellent metal adhesion.

Furthermore, the films can be printed and laminated using conventional methods.

BOPP films utilizing copolyester have excellent optical characteristics and are sealable.

The foregoing detailed description is given for clearness of understanding only, and no unnecessary limitations should be understood therefrom, as modifications within the scope of the invention may apparent to those skilled in the art.

What is claimed is:

1. A method of making a multilayer film, comprising the steps of:
    (a) forming a core layer comprising a polypropylene film;
    (b) monoaxially orienting the core layer in a first direction;
    (c) coating or laminating a multilayer cap film to at least one side of the monoaxially oriented core layer to provide a multilayer film, said cap film comprising at least one polyester layer and at least a first tie layer with said first tie layer interposed between said polyester layer and said core layer, said first tie layer comprising a polyolefin adhesive, and said polyester layer containing sufficient silicone fluid to impart substantially uniform stretching characteristics thereto;
    (d) orienting said multilayer film of step (c) in a second direction transverse to said first direction to provide a biaxially-oriented multilayer film; and,
    (e) thereafter metallizing an outer surface of said multilayer film opposite said polyester layer.

2. A method of making a multilayer film, comprising the steps of:
    (a) forming a core layer comprising a polypropylene film, said core layer containing at least one incompatible inorganic mineral in an amount sufficient to render said core substantially opaque;
    (b) monoaxially orienting the core layer in a first direction;
    (c) coating or laminating a multilayer cap film to at least one side of the monoaxially oriented core layer to provide a multilayer film, said cap film comprising at least one polyester layer and at least a first tie layer with said first tie layer interposed between said polyester layer and said core layer, said first tie layer comprising a polyolefin adhesive, and said polyester layer containing sufficient silicone fluid to impart substantially uniform stretching characteristics thereto; and,
    (d) orienting said multilayer film of step (c) in a second direction transverse to said first direction to provide a biaxially-oriented multilayer film.

3. The method of claim 2 wherein said inorganic mineral is selected from the group consisting of titanium dioxide, aluminum oxide, zinc oxide, calcium sulfate, barium sulfate, calcium carbonate, magnesium carbonate, silica, sodium silicate, aluminum silicate, mica, clay, and talc.

4. The method of claim 2 wherein said inorganic mineral is titanium dioxide and is present in said core layer in a concentration in the range of about 1 wt. % to about 20 wt. %.

5. The method of claim 4 wherein said titanium dioxide concentration is in the range of about 4 wt. % to about 15 wt. %.

6. The method of claim 2 wherein said mineral is selected from aluminum oxide, zinc oxide, calcium sulfate, barium sulfate, calcium carbonate, magnesium carbonate, silica, sodium silicate, aluminum silicate, mica, clay, and talc and is present in said core layer in a concentration in the range of about 2 wt. % to about 25 wt. %.

7. A method of making a multilayer film, comprising the steps of:
    (a) forming a core layer comprising a polypropylene film;
    (b) monoaxially orienting the core layer in a first direction;
    (c) coating or laminating a multilayer cap film to at least one side of the monoaxially oriented core layer to provide a multilayer film, said cap film comprising at least one polyester layer and at least a first tie layer with said first tie layer interposed between said polyester layer and said core layer, said first tie layer comprising a polyolefin adhesive, and said polyester layer containing sufficient silicone fluid to impart substantially uniform stretching characteristics thereto; and,
    (d) orienting said multilayer film of step (c) in a second direction transverse to said first direction to provide a biaxially-oriented multilayer film, wherein said multilayer film contains at least one additive selected from the group consisting of antioxidants, lubricants, surfactants, antistats, slip agents, antiblock agents, nucleating agents, coupling agents, coated minerals, pigments, and dyes.

8. A method of making a multilayer film, comprising the steps of:
    (a) forming a core layer comprising a polypropylene film coextruded between first and second polyolefin layers;
    (b) monoaxially orienting the core layer in a first direction;
    (c) coating or laminating a multilayer cap film to at least one side of the monoaxially oriented core layer to provide a multilayer film, said cap film comprising at least one polyester layer and at least a first tie layer with said first tie layer interposed between said polyester layer and said core layer, said first tie layer comprising a polyolefin adhesive, and said polyester layer containing sufficient silicone fluid to impart substantially uniform stretching characteristics thereto; and,
    (d) orienting said multilayer film of step (c) in a second direction transverse to said first direction to provide a biaxially-oriented multilayer film.

9. The method of claim 8 wherein said polypropylene film contains at least one incompatible inorganic mineral in an amount sufficient to render said core layer substantially opaque.

10. The method of claim 9 wherein at least one of said first and second polyolefin layers contains at least one incompatible inorganic mineral in an amount sufficient to enhance the opacity of said core layer.

11. The method of claim 10 wherein at least one of said first and second polyolefin layers contains titanium dioxide.

12. The method of claim 11 wherein said polyolefin layer that contains titanium dioxide also contains a cavitating mineral.

13. The method of claim 12 wherein said cavitating mineral is calcium carbonate.

14. The method of claim 8 wherein said polypropylene film is substantially free of incompatible inorganic minerals and at least one of said first and second polyolefin layers contains at least one incompatible inorganic material in an amount sufficient to render said core layer substantially opaque.

15. The method of claim 14 wherein at least one of said first and second polyolefin layers contains titanium dioxide.

16. The method of claim 15 wherein said polyolefin layer that contains titanium dioxide also contains a cavitating mineral.

17. The method of claim 16 wherein said cavitating mineral is calcium carbonate.

18. The method of claim 8 wherein at least one outer surface of said multilayer film is metallized.

19. A method of making a multilayer film, comprising the steps of:

(a) forming a core layer comprising a polypropylene film;

(b) monoaxially orienting the core layer in a first direction;

(c) coating or laminating a multilayer cap film to at least one side of the monoaxially oriented core layer to provide a multilayer film, said cap film comprising at least one polyester layer and at least a first tie layer with said first tie layer interposed between said polyester layer and said core layer, said first tie layer comprising an adhesive selected from the group consisting of copolymers of ethylene with at least one carboxylic acid or carboxylic acid anhydride and terpolymers of ethylene, an ester, and a carboxylic acid or carboxylic acid anhydride, and said polyester layer containing sufficient silicone fluid to impart substantially uniform stretching characteristics thereto; and, (d) orienting said multilayer film of step (c) in a second direction transverse to said first direction to provide a biaxially-oriented multilayer film.

20. The method of claim 19 wherein said ester is selected from the group consisting of vinyl acetate, methyl acrylate, butyl acrylate, ethyl acrylate, and partially hydrolyzed ester derivatives.

21. The method of claim 19 wherein said carboxylic acid or carboxylic acid anhydride is selected from the group consisting of acrylic acid, methacrylic acid, maleic acid, and maleic anhydride.

22. The method of claim 21 wherein said tie layer is an ethylene-acrylic acid copolymer.

23. The method of claim 19 wherein said terpolymer is an ethylene-ester copolymer modified with a carboxylic acid or carboxylic acid anhydride.

24. The method of claim 23 wherein said terpolymer is an ethylene-ester copolymer backbone grafted with a carboxylic acid or carboxylic acid anhydride.

25. The method of claim 19 wherein said adhesive is a terpolymer wherein said ethylene, said ester, and said carboxylic acid or acid anhydride are incorporated in a main chain of said terpolymer.

* * * * *

UNITED STATES PATENT AND TRADEMARK OFFICE
CERTIFICATE OF CORRECTION

| | | |
|---|---|---|
| PATENT NO. | : 6,221,191 B1 | Page 1 of 1 |
| APPLICATION NO. | : 08/796272 | |
| DATED | : April 24, 2001 | |
| INVENTOR(S) | : Alan M. Davis, John H. Lawrence and Tung-Yao Weng | |

It is certified that error appears in the above-identified patent and that said Letters Patent is hereby corrected as shown below:

Title Page; item (63); please delete;

In the Declaration for Patent Application and Power of Attorney, relocate the designation "PCT/US96/09420 7 June 1996" from the line that refers to a claim of priority under 35 U.S.C. 119(e), to the line that refers to a claim of priority under 35 U.S.C. 120.

and;
Please insert; item (30);

In the Declaration for Patent Application and Power of Attorney, relocate the designation "PCT/US96/09420 7 June 1996" from the line that refers to a claim of priority under 35 U.S.C. 119(e), to the line that refers to a claim of priority under 35 U.S.C. 120.

Signed and Sealed this

Fifteenth Day of January, 2008

JON W. DUDAS
*Director of the United States Patent and Trademark Office*